(12) United States Patent
Shaw

(10) Patent No.: US 6,550,738 B2
(45) Date of Patent: Apr. 22, 2003

(54) HEIGHT-ADJUSTABLE PICKUP-BED COVER PROP

(76) Inventor: Leonard Shaw, 595 Fairway Dr., Novato, CA (US) 94949

( * ) Notice: Subject to any disclaimer, the term of this patent is extended or adjusted under 35 U.S.C. 154(b) by 0 days.

(21) Appl. No.: 10/017,749

(22) Filed: Dec. 13, 2001

(65) Prior Publication Data

US 2002/0063195 A1 May 30, 2002

Related U.S. Application Data

(60) Provisional application No. 60/256,175, filed on Dec. 15, 2000.

(51) Int. Cl.[7] ................................................ A47F 5/00
(52) U.S. Cl. ............ 248/352; 296/100.06; 296/100.07; 292/339; 292/DIG. 26
(58) Field of Search .............................. 248/352, 354.1; 296/100.1, 100.01, 100.06, 100.07, 100.09, 167; 292/339, DIG. 26

(56) References Cited

U.S. PATENT DOCUMENTS

| | | | | |
|---|---|---|---|---|
| 2,606,735 A | * | 8/1952 | Zembrosky et al. | 188/32 |
| 4,070,050 A | * | 1/1978 | Glock et al. | 292/339 |
| 4,083,596 A | * | 4/1978 | Robertson | 296/100.1 |
| 4,522,440 A | * | 6/1985 | Gostomski | 296/100.07 |
| 4,594,157 A | * | 6/1986 | McGowan | 210/163 |
| 4,861,092 A | * | 8/1989 | Bogard | 296/100.09 |
| 5,094,499 A | * | 3/1992 | Simone, Jr. | 296/100.1 |

* cited by examiner

Primary Examiner—Korie Chan
(74) Attorney, Agent, or Firm—Integral Patent Associates

(57) ABSTRACT

A pickup-bed cover prop having an elongated base, a pair of straps attached to the base, a pair of struts extending orthogonally from the base, and a clamp on each strut at the end distal from the end attached to the base. Each strut includes a mechanism which allows the length of the strut to be adjusted and secured. The prop is secured to the truck bed by lowering the rear gate of the pickup bed, passing the straps through the space between the rear edge of the bed and the bottom of the gate, aligning the base of the prop with the rear edge of the bed, and closing the gate, thereby securing the straps due to pressure applied to the straps by the rear edge of the bed and the bottom of the gate. The orientation of the cover is secured by clamping the clamps to the rear end of the cover, and adjusting and securing the lengths of the struts. According to the preferred embodiment, the clamps are ratcheting clamps and are pivotable, and the length-adjustment mechanism in each strut is a twist lock/release mechanism.

10 Claims, 4 Drawing Sheets

HEIGHT-ADJUSTABLE PICKUP-BED COVER PROP

RELATED APPLICATIONS

The present application is based on provisional patent application Ser. No. 60/256,175, filed Dec. 15, 2000, of the same title and by the same inventor.

BACKGROUND OF THE INVENTION

The present invention is directed to automobile accessories, more particularly to accessories for pick-up trucks, and more particularly still to accessories for use with pickup truck bed covers.

Pickup truck owners haul a wide variety of cargos in the beds of their pickup trucks. During fair weather, cargo can be hauled in a pickup bed without concern for damage from the elements. However, during inclement weather some types of cargo must be protected from the environment. To provide such protection, a variety of pickup truck bed covers are manufactured and marketed. However, the usefulness of pickup truck bed covers is hampered by the fact that their design generally allows the cover to be secured only in a horizontal orientation, thereby limiting the height of the cargo that can be hauled in the pickup truck bed. To overcome this limitation, a variety of pickup-bed cover props are manufactured and marketed. However, pickup-bed cover props according to the current state of the art have a number of limitations which makes their use inconvenient or impractical. For instance, current state-of-the-art pickup-bed cover props are typically complicated, bulky, difficult to set up (or require involved, semi-permanent installation), unwieldy to manipulate when altering the height of prop, and/or do not allow continuous adjustment of the height of the prop.

It is therefore a general object of the present invention to provide a pickup-bed cover prop which is light weight, and simple, convenient, and easy to install and use.

Furthermore, it is a general object of the present invention to provide a pickup-bed cover prop which is simple, convenient and easy to secure to the pickup, attach to the pickup-bed cover, and adjust the orientation of the propped-up pickup-bed cover.

Furthermore, it is an object of the present invention to provide a pickup-bed cover prop which may be installed without damage to or alteration of the pickup bed.

Furthermore, it is a general object of the present invention to provide a pickup-bed cover prop which is simple, convenient and easy to detach from the pickup and the pickup-bed cover.

Furthermore, it is a general object of the present invention to provide a pickup-bed cover prop which allows a pickup-bed cover to be used to cover cargo exceeding the height of the walls of the pickup bed.

It is another object of the present invention to provide a pickup-bed cover prop which allows the orientation of a propped-up pickup-bed cover to be adjusted, particularly through a continuum of orientations.

Furthermore, it is an object of the present invention to provide a pickup-bed cover prop which maintains the orientation of a propped-up pickup-bed cover when forces, such as wind, air drag or acceleration, are applied to the pickup-bed cover.

Furthermore, it is an object of the present invention to provide a pickup-bed cover prop which stabilizes a propped-up pickup-bed cover against pitch and yaw motions.

It is another object of the present invention to provide a pickup-bed cover prop whose installation utilizes to advantage the standard features of a pickup truck, particularly the standard features of a pickup truck bed.

Additional objects and advantages of the present application will become apparent upon review of the Figures, Detailed Description of the Present Invention, and appended claims.

SUMMARY OF THE INVENTION

The present invention is directed to a pickup-bed cover prop having an elongated base, a means for securing the base to the truck bed, a strut extending from the base, and a means for removably attaching the top end of the strut to the cover to secure the cover at an orientation where it does not rest on the side or rear walls of the pickup truck bed.

DETAILED DESCRIPTION OF THE PREFERRED EMBODIMENTS

Figure 1:
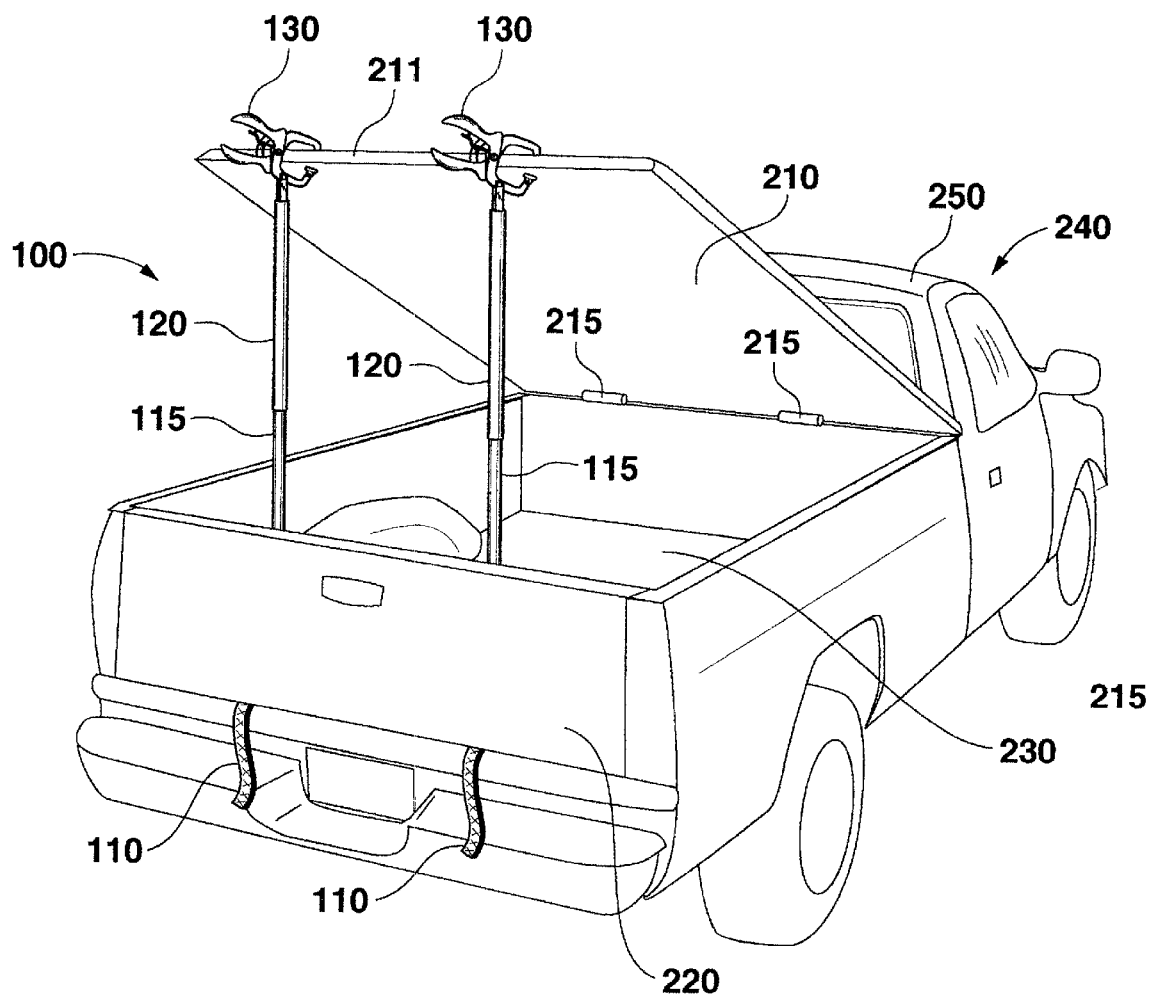
FIG. 1 shows the pickup-bed cover prop of the present invention utilized to elevate the rear end of a bed cover.

As can be seen from FIG. 1, the height-adjustable pickup-bed cover prop 100 of the present invention is used for securing a cover 210 for the bed 230 of a pickup truck 240 at a desired height. Typically, the cover 210 is pivotable on hinges 215 located at the top of the bed 230 at the end nearest the cab 250 of the truck 240. When the bed 230 carries no cargo, or a cargo (not shown) having a height less than the depth of the bed 230, then the cover 210 may be secured horizontally (not depicted) so as to seal the bed 230. However, if the cargo has a height greater than the depth of the bed 230, then an unsecured cover 210 will not have a secured pitch orientation and will tend to bounce up and down during travel. Such a situation is likely to cause damage to the cover 210 or the cargo.

Figure 2:
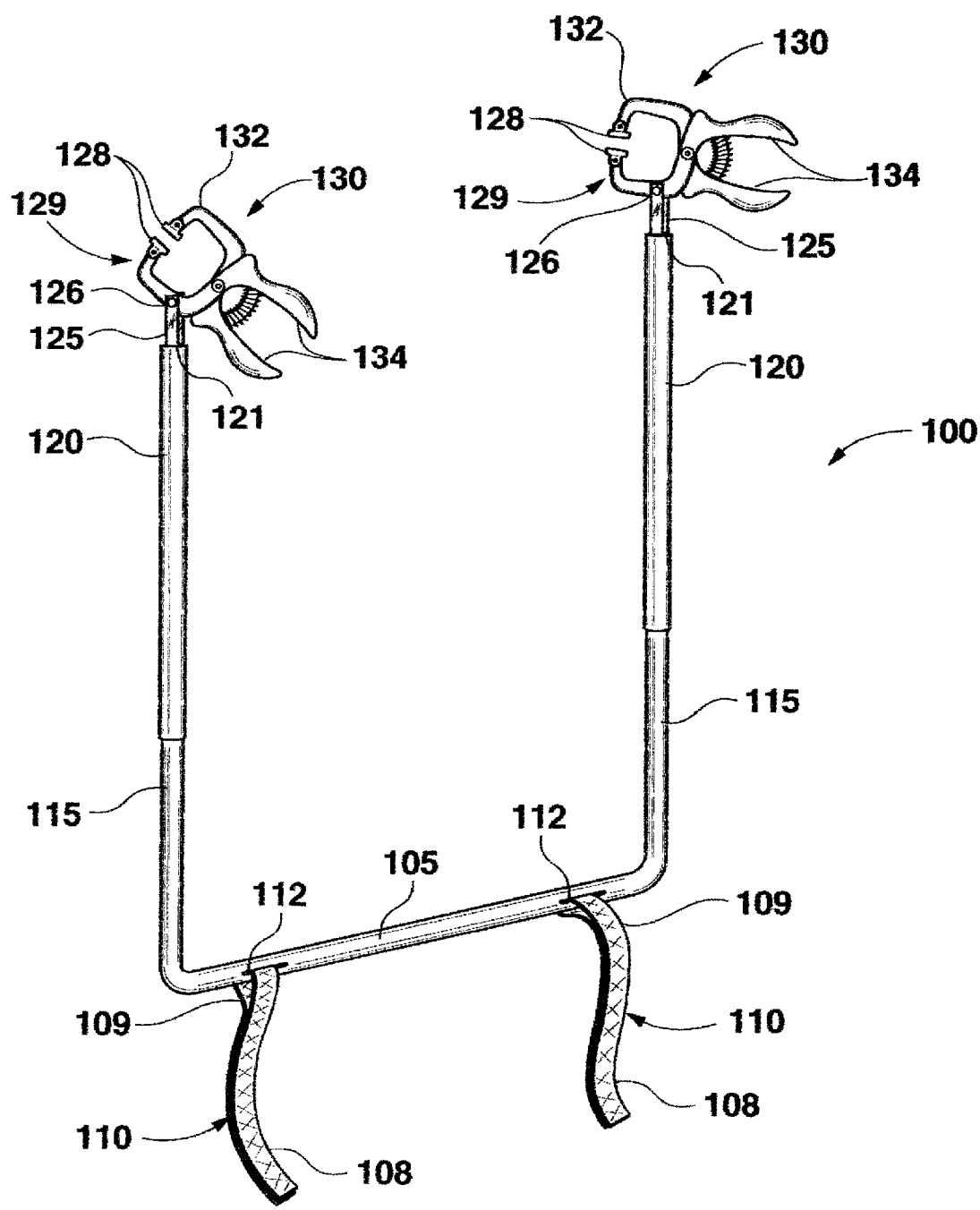
FIG. 2 shows the pickup-bed cover prop of the present invention.
Figure 3:
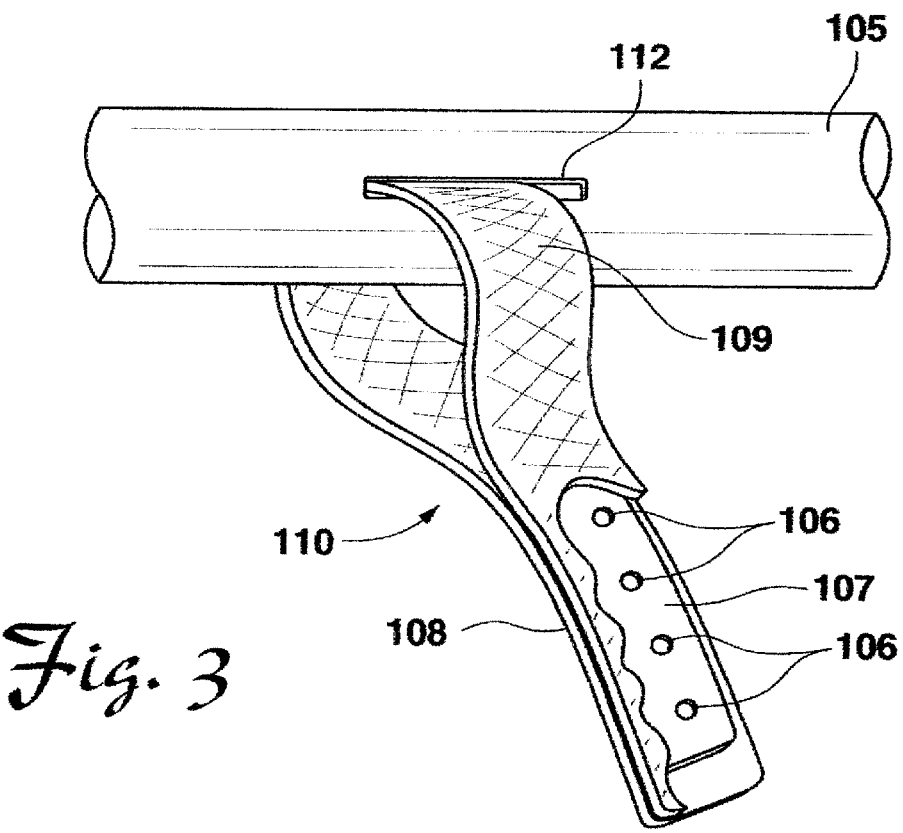
FIG. 3 shows a close-up view of a portion of the base of the pickup-bed cover prop of the present invention with a sectional view of a strap which passes through a slit in the base.

The height-adjustable pickup-bed cover prop 100 of the present invention is shown in detail in FIG. 2. The prop 100 has an elongated base 105 with a through-slit 112 located near each end of the base 105. As shown in the cut-away close-up view of FIG. 3, each strap 110 passes through a through-slit 112, and is secured to the base 105 by bonding end portions 108 of the strap 110 together, so that a loop 109 is formed by a central portion 109 of the strap 110. As shown in the cutaway close-up view of FIG. 3, a stiffening strip 107 made of a bendable metal is sandwiched between the bonded end portions 108 of the strap 110. According to the preferred embodiment of the present invention, each strap 110 is made of a durable woven nylon or nylon-like material having a thickness of approximately ⅛ inch, and the bendable metal is a #20-gauge, galvanized steel hanger strip. (Although not necessary for the operation of the height-adjustable pickup-bed cover prop 100 of the present invention, the stiffening strip 107 is shown with a series of apertures 106, since hanger straps require such apertures 106 for their ordinary use.)

Figure 4:
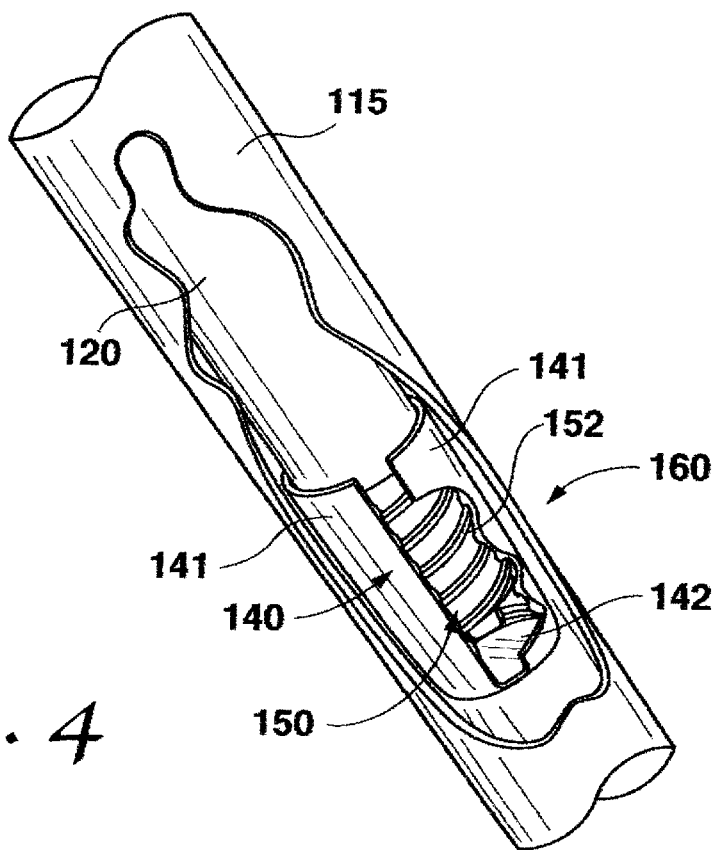
FIG. 4 shows a close-up, sectional view of the internal length-adjustment mechanism within a strut.

Furthermore, as shown in FIG. 2, two parallel tubular struts 115 extend perpendicularly from the base 105 at distal ends thereof. A tubular extension arm 120 is slidably mounted coaxially within each strut 115, and, as shown in FIG. 4, a twist lock/release mechanism 160 within each strut 115 allows the longitudinal position of each extension arm 120 to be locked by a rotation of the extension arm 120 about its longitudinal axis. The longitudinal position of each extension arm 120 may subsequently be unlocked by a rotation in the opposite direction. FIG. 4 provides a cutaway view of the twist lock/release mechanism 160 which allows for rotational locking and unlocking of the position of the tubular extension arm 120 relative to the strut 115. Such a mechanism 160 is, for instance, used by Sunshine Industries, Inc. of Cleveland, Ohio for their Webster™ All-Purpose Duster. As shown in FIG. 4, a cap 150 having threading 152 on its outer surface is affixed to the lower end of the extension arm 120. Disregarding the threading 152 on the threaded cap 150, the threaded cap 150 has a truncated conical shape, with the cross-sectional diameter of the truncated cone decreasing in the downwards direction. Threaded onto the threaded cap 150 is a threaded sleeve 140 having a circular base 142 and two wings 141 extending upwards from the base 142. The interior surfaces of the wings 141 are threaded with a pitch to allow threaded mating with the threads of the cap 150, and the threading of the wings 141 is terminated near the top of the wings 141 to prevent the cap 150 from being separated from the sleeve 140. The threaded sleeve 140 is made of a material which is rigid, but bendable enough that the wings 141 are bent outwards as the threaded cap 150 is screwed into the threaded sleeve 140 due to the truncated conical shape of the cap 150. The exterior of dimensions of the wings 141 are sufficiently large, and the exterior surfaces of the wings 141 are sufficiently frictional that the sleeve 140 does not rotate substantially when the cap 150 is rotated, even when the wings 141 are not spread by the cap 150 and the extension arm 120 is movable longitudinally. Furthermore, the exterior of dimensions of the wings 141 are sufficiently large, and the exterior surface of the wings 141 are sufficiently frictional that the sleeve 140 does not rotate and cannot be moved longitudinally when the wings 141 are caused to be spread by the cap 150. These features allow for the locking and unlocking of the longitudinal position of the extension arm 120 by rotation of the extension arm in a first rotational direction and a second, opposite rotational direction, respectively.

As shown in FIG. 2, a U-bracket 125 is mounted at the top end 121 of each extension arm 120, and each U-bracket 125 is rotatable about the longitudinal axis of the extension arm 120 on which it is mounted. Each clamp 130 has a jaw portion 132 and a handle portion 134, and is pivotally mounted to a U-bracket 125 on a pivot bar 126 which extends between the top ends of the uprights of the U-bracket 125 and passes through the lower half of the jaw portion 132. Each clamp 130 is spring-biased to force the jaws 132 into a closed position, i.e., a position where outer ends 129 of the top and bottom portions of the jaw 132 are in contact. A first rubber pad 128 is mounted on the outer end 129 of the top portion of the jaw 132 and a second rubber pad 128 is mounted on the outer end 129 of the bottom portion of the jaw 132 of each clamp 130. The rubber pads 128 provide cushioning, so that the clamps 130 do not scratch or mar the pickup-bed cover 210. When manipulated into the open position by forcing the handle portions 134 of a clamp 130 together, the jaws 132 spread such that there is a distance of approximately 7.6 cm between the rubber pads 128. The spring-loading of each clamp 130 should provide sufficient force to the jaws 132 to provide a grip on the pickup-bed cover 210 which is firm enough to withstand dislocating forces induced during motion of the pickup truck 240. Yet the spring-loading of each clamp 130 should not be so strong as to prevent a person with reasonable hand strength from squeezing the handle sections 134 together, and thereby opening the jaws 132, using a single hand.

Figure 5:
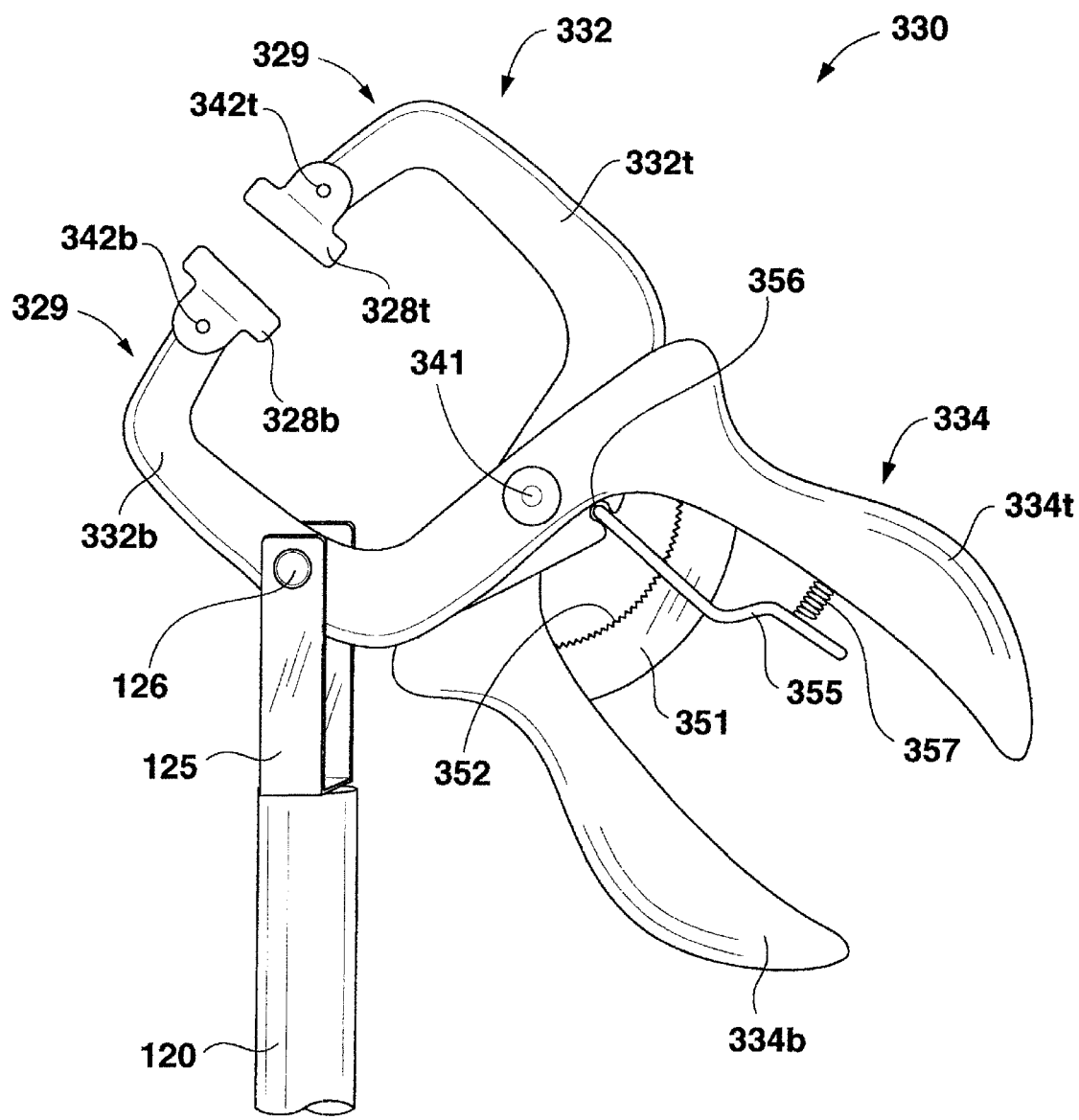
FIG. 5 shows a close-up view of a ratcheting clamp at the top end of a strut.

In an alternate embodiment of the present invention, a ratcheting clamp 330, as shown in FIG. 5, is substituted for each of the spring-biased clamps 130 described above. Each ratcheting clamp 330 has a jaw 332 and a handle 334, and is pivotally mounted to each U-bracket 125 on a pivot bar 126 which extends between the top ends of the uprights of the U-bracket 125 and passes through the lower half 332b of the jaw 332. The upper half 332t of the jaw 332 is integrally connected to the bottom half 334b of the handle 334, and the lower half 332b of the jaw 332 is integrally connected to the upper half 334t of the handle 334. Each ratcheting clamp 330 is biased by a biasing spring (not visible in FIG. 5) located inside the exterior of the clamp 330 near a pivot 341 about which the upper half 332t of the jaw 332 and the lower half 334b of the handle 334 pivots about the lower half 332b of the jaw 332 and the upper half 334t of the handle 334. The biasing spring forces the jaws 332 into an open position, i.e., a position where outer ends 329 of the top and bottom portions 332t and 332b of the jaw 332 are separated. An upper grip pad 328t is mounted on the outer end 329 of the top half 332t of the jaw 332, and a lower grip pad 328b is mounted on the outer end 329 of the lower half 332b of the jaw 332 of each clamp 330. The upper and lower grip pads 328t and 328b are rotatable about upper and lower pad pivots 342t and 342b to provide good contact with the pickup-bed cover 210 which is to be gripped by the clamps 330. An arced ratchet arm 351 is mounted on the bottom half 334b of the handle 334, and extends upwards through an aperture (not visible in FIG. 5) in the upper half 334t of the handle 334. The center of the arc of the ratchet arm 351 is roughly coincident with the location of the pivot 341. The ratchet arm 351 has a series on inclined teeth 352 along the side of the ratchet arm 351 closest to the pivot 341. A pawl 355, which is pivotable about a pawl pivot 356 located on the upper half 334 of the handle 334 near the pivot 341, has an aperture (not visible in FIG. 5) through which the ratchet arm 351 passes, and is biased by spring 357 to be engaged with the teeth 352 of the ratchet arm 351, thereby preventing the jaws 332 from opening. However, since the teeth 352 are inclined, while the pawl 355 is engaged with the teeth 352 of the ratchet arm 351, the upper and lower halves 334t and 334b of the handle 334 can be moved together to cause the jaws 332 to be closed. The jaws 332 may be separated by pressing the pawl 335 against the bias of the spring 357 and towards the upper half 334t of the handle 334, thereby rotating the pawl 355 away from contact with the teeth 352 of the ratchet arm 351. The spring-bias of the jaws 332 discussed above will force the top and bottom halves 332t and 332b of the jaws 332 apart when the pawl 355 is pressed against the upper half 334t of the handle 334. In the preferred embodiment of the present invention which uses ratcheting clamps, each ratcheting clamp 330 is a Quick-Grip®, Handi-Clamp™, item number AMT 58300, distributed by American Tool Companies of Vernon Hills, Ill.

When manipulated into the open position by pressing the pawl 355 against the upper half 334t of the handle 334, the jaws 332 spread such that there is a distance of approximately 5.0 cm between the grip pads 328t and 328b. In contrast with the spring-biased clamps 130 discussed above, the pressure exerted by grip pads 328t and 328b on the rear end 211 of the pick-up bed cover 210 is dependent on the force applied in pressing the top and bottom halves 334t and 334b of the handle 334 together. In use as described below, the pressure exerted by grip pads 328t and 328b on the rear end 211 of the cover 210 should be sufficient to withstand dislocating forces induced during motion of the pickup truck 240.

The use of the height-adjustable pickup-bed cover prop 100 of the present invention involves the steps of:
(1) securing the base 105 of the prop 100 at the rear the bed 230 of the truck 240;
(2) attaching the clamps 130 or 330 to the rear end 211 of the cover 210; and
(3) adjusting and securing the heights of the extension arms 120 as desired, thereby securing the orientation of the cover 210.

It should be noted that the above steps need not be performed in the order listed.

The base 105 is secured to the bed 230 of the truck 240 by feeding the end portion 108 of each strap 110 between the bottom edge of the tailgate 220 and the rear end of the bed 230 when the tailgate 220 is ajar to some extent, and then closing the tailgate 220 so that the straps 110 are secured by pressure between the bottom of the tailgate 220 and the rear end of the bed 230. The stiffening strips 107 in the end portions 108 of the straps 110 supplements the stiffness of the nylon material in the straps 110, so that the end portions 108 of the straps 110 may more easily be passed through the region between the bottom edge of the tailgate 220 and the rear end of the bed 230. The stiffening strips 107 are sufficiently bendable that they 107 will readily deform when the tailgate 220 is shut, so as not to damage the tailgate 220 or the rear end of the bed 230. Furthermore, the stiffening strips 107 are located in the straps 108 sufficiently near the ends thereof to avoid contact of the portions of the straps 108 having stiffening strips 107 with the bottom edge of the tailgate of the vehicle 240. Optimal performance of the prop 100 is obtained when the base 105 abuts the edge between the tailgate 220 and the bed 230, so that the base 105 has limited mobility. As described above, the longitudinal positions of the extension arms 120 can be adjusted, and locked in place by rotation of the extension arms 120 about their longitudinal axes. It should be noted that the use of two struts 115 in the pickup-bed cover prop of the present invention (rather than just a single strut 115) provides the advantage of securing the cover 210 against yaw (i.e., side-to-side rocking motion). The adjustability of the orientation of the clamps 130 or 330, and the distance which the pads 128 or 328t and 328b of the jaws 132 or 332 of the clamps 130 or 330 may spread, allows a wide variety of constructions of pick-up bed covers 210 to be gripped by the clamps 130 or 330.

The foregoing descriptions of a specific embodiment of the present invention has been presented for purposes of illustration and description. It is not intended to limit the invention to the precise form disclosed, and it should be understood that many modifications and variations are possible and are to be considered within the scope of the present invention. For instance: the clamps may have some other construction; the clamps may be of some other size; the clamps may be biased using some other means; the ends of the extension arms may be removably securable to the end of the bed cover using some other means; the extension arms may use some other type of internal mechanism to provide positional locking and unlocking by rotation of the extension arm; locking and unlocking of the position of the extension arm may be accomplished using a mechanism which is not activated by rotation of the extension arm; the straps may be made of a material which does not require an additional element to provide stiffening; the straps may be mounted to the base of the prop in some other fashion; the prop may have only a single strut; the extension arms may use some other type of mechanism to secure their position relative to the strut; etc. Therefore, it is intended that the scope of the invention will be defined by the claims which are appended below and their equivalents.

What is claimed is:

1. An automotive accessory for propping up a cover of a pickup bed, a pivot edge of said cover being attached to said truck and said cover being rotatable about said pivot edge from a first orientation to a second orientation, walls of said truck bed not providing support of said cover when said cover is in said first orientation, said cover being supported by at least one of said walls of said truck bed when said cover is in said second orientation, comprising:

an elongated base having a longitudinal axis;

a means for securing said base to said truck bed;

a strut extending orthogonally from said longitudinal axis of said elongated base, said strut having a proximal end near said elongated base, and a distal end opposite said proximal end;

an attachment means for removably attaching said distal end of said vertical strut to said cover to secure said cover in said first orientation, wherein said pickup bed includes a gate rotatably connected to a rear edge of said truck bed by a pivot mechanism, said gate having an open position and a securable, closed position, a space between a lower edge of said gate and said rear edge of said pickup bed being reduced when said gate is moved from said open position to said closed position, said means for securing said base including a first flexible strap attached to said base, said base being secured at said rear edge of said truck bed by aligning an edge of said elongated base with said rear edge of said pickup bed, placing said first flexible strap through said space between said lower edge of said gate and said rear edge of said truck bed when said gate is in said open position, and moving said gate to said closed position.

2. The automotive accessory of claim 1 wherein said cover is removably attached to said truck.

3. The automotive accessory of claim 1 wherein said means for securing said base further includes a second flexible strap attached to said base, said first flexible strap being located to a first side of a mid-point of said longitudinal axis of said elongated base, and said second flexible strap being located to a second side of said mid-point of said elongated base, said base being secured at said rear edge of said pickup bed by also placing said second flexible strap through said space between said lower edge of said gate and said rear edge of said truck bed when said gate is in said open position, and moving said gate to said closed position.

4. The automotive accessory of claim 1 wherein said first flexible strap includes a stiffening element.

5. The automotive accessory of claim 4 wherein said stiffening element is a piece of malleable metal.

6. An automotive accessory for propping up a cover of a pickup bed, a pivot edge of said cover being attached to said truck and said cover being rotatable about said pivot edge from a first orientation to a second orientation, walls of said truck bed not providing support of said cover when said cover is in said first orientation, said cover being supported by at least one of said walls of said truck bed when said cover is in said second orientation, comprising:

an elongated base having a longitudinal axis;

a means for securing said base to said truck bed;

a strut extending orthogonally from said longitudinal axis of said elongated base, said strut having a proximal end near said elongated base, and a distal end opposite said proximal end;

an attachment means for removably attaching said distal end of said vertical strut to said cover to secure said cover in said first orientation, wherein said attachment means for attaching said distal end of said strut to said cover is a clamp which is clampable onto a clamping edge of said cover.

7. The automotive accessory of claim 6 wherein said clamp is a ratcheting clamp.

8. The automotive accessory of claim 6 wherein said clamp is a spring clamp.

9. The automotive accessory of claim 6 wherein said clamping edge is opposite said pivot edge of said cover.

10. The automotive accessory of claim 6 wherein said clamp is pivotably attached to said distal end of said strut.

* * * * *